United States Patent
Bleckmann et al.

(10) Patent No.: US 10,287,939 B2
(45) Date of Patent: May 14, 2019

(54) EXHAUST GAS AFTER-TREATMENT UNIT FOR AN INTERNAL COMBUSTION ENGINE

(71) Applicant: Daimler AG, Stuttgart (DE)

(72) Inventors: Johannes Bleckmann, Stuttgart-Ost (DE); Claudia Essmann, Stuttgart (DE); Uwe Gaertner, Remshalden (DE); Alexander Massner, Esslingen (DE); Michael Stiller, Remseck (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 16/064,813

(22) PCT Filed: Dec. 12, 2016

(86) PCT No.: PCT/EP2016/002090
§ 371 (c)(1),
(2) Date: Jun. 21, 2018

(87) PCT Pub. No.: WO2017/108165
PCT Pub. Date: Jun. 29, 2017

(65) Prior Publication Data
US 2019/0003360 A1    Jan. 3, 2019

(30) Foreign Application Priority Data
Dec. 24, 2015    (DE) .......... 10 2015 016 986

(51) Int. Cl.
*F01N 3/035*    (2006.01)
*F01N 3/20*    (2006.01)
(Continued)

(52) U.S. Cl.
CPC ......... *F01N 3/035* (2013.01); *B01D 46/0027* (2013.01); *B01D 46/0061* (2013.01);
(Continued)

(58) Field of Classification Search
CPC ............ F01N 3/2066; F01N 3/035; F01N 2510/0684; B01D 53/9468; B01D 46/0061
(Continued)

(56) References Cited

U.S. PATENT DOCUMENTS 6,892,529 B2 * 5/2005 Duvinage ............. F01N 3/0253
60/286
7,984,609 B2    7/2011 Doering
(Continued)

FOREIGN PATENT DOCUMENTS

| DE | 10 2006 038 291 A1 | 2/2008 |
| DE | 10 2012 005 508 A1 | 9/2013 |
| DE | 10 2012 018 953 A1 | 3/2014 |

OTHER PUBLICATIONS

PCT/EP2016/002090, International Search Report dated Feb. 16, 2017 (Two (2) pages).
(Continued)

*Primary Examiner* — Tom P Duong
(74) *Attorney, Agent, or Firm* — Crowell & Moring LLP

(57) ABSTRACT

An exhaust gas after-treatment unit includes a first catalytic converter, a particle filter arranged downstream of the first catalytic converter, and a second catalytic converter arranged downstream of the particle filter and which is a selective catalytic reduction (SCR) catalytic converter. The first catalytic converter is a combination catalytic converter including a first catalytic converter part which is an SCR catalytic converter, a second catalytic converter part arranged downstream of the first catalytic converter part which is an ammonia slip catalytic converter and has a noble metal layer with a first noble metal content, a third catalytic converter part arranged downstream of the second catalytic converter part which is an oxidation catalytic converter and has a noble metal layer with a second noble metal content, (Continued)

and an SCR layer arranged on the noble metal layers and extending over the entire length of the second and third catalytic converter parts.

11 Claims, 2 Drawing Sheets

(51) Int. Cl.
| | | |
|---|---|---|
| | *F01N 3/10* | (2006.01) |
| | *F01N 13/00* | (2010.01) |
| | *B01D 46/00* | (2006.01) |
| | *F01N 3/023* | (2006.01) |
| | *B01D 53/94* | (2006.01) |

(52) U.S. Cl.
CPC ......... *B01D 53/9468* (2013.01); *F01N 3/023* (2013.01); *F01N 3/103* (2013.01); *F01N 3/106* (2013.01); *F01N 3/2066* (2013.01); *F01N 13/0097* (2014.06); *B01D 2255/1021* (2013.01); *B01D 2255/1023* (2013.01); *B01D 2279/30* (2013.01); *F01N 2510/0684* (2013.01); *F01N 2610/02* (2013.01)

(58) Field of Classification Search
USPC .................................. 422/168, 171, 177, 180
See application file for complete search history.

(56) References Cited

U.S. PATENT DOCUMENTS

| 8,404,011 | B2* | 3/2013 | Doring ................. F01N 3/0253 |
| | | | 422/169 |
| 2005/0069476 | A1* | 3/2005 | Blakeman .......... B01D 53/9431 |
| | | | 423/239.1 |
| 2006/0059896 | A1* | 3/2006 | Liu ........................ F01N 3/0253 |
| | | | 60/286 |
| 2006/0153761 | A1* | 7/2006 | Bandl-Konrad ... B01D 53/9431 |
| | | | 423/239.1 |
| 2008/0041040 | A1* | 2/2008 | During .................. B01D 39/06 |
| | | | 60/295 |
| 2011/0271664 | A1 | 11/2011 | Boorse et al. |
| 2016/0367941 | A1* | 12/2016 | Gilbert ............... B01D 53/9468 |
| 2016/0367973 | A1* | 12/2016 | Larsson ............ B01D 53/9418 |
| 2018/0111086 | A1* | 4/2018 | Chen ................. B01D 53/9418 |

OTHER PUBLICATIONS

German Search Report issued in German counterpart application No. 10 2015 016 986.6 dated Aug. 20, 2016, with Statement of Relevancy (Eight (8) pages).

* cited by examiner

EXHAUST GAS AFTER-TREATMENT UNIT FOR AN INTERNAL COMBUSTION ENGINE

BACKGROUND AND SUMMARY OF THE INVENTION

The invention relates to an exhaust gas after-treatment unit for an internal combustion engine, in particular of a motor vehicle.

Exhaust gas after-treatment units for internal combustion engines, especially for motor vehicles, have long been known from the general prior art and particularly from serial vehicle manufacturing.

The internal combustion engine has at least one combustion chamber, in particular in the form of a cylinder, into which fuel especially liquid fuel, and air are fed during operation of the internal combustion engine with the throttle open. This creates in the combustion chamber a fuel-air mixture, which is also called the mixture and is burned. This results in exhaust gas from the internal combustion engine, wherein the exhaust gas can flow out from at least one internal combustion engine outlet and, therefore, out of the internal combustion engine itself.

By means of an exhaust pipe, for example, the exhaust gas is directed towards the exhaust gas after-treatment unit so that the internal combustion engine exhaust gas can be after-treated using the exhaust gas after-treatment unit. To this end, the exhaust gas after-treatment unit comprises at least one SCR catalytic converter through which the internal combustion engine exhaust gas can flow and by means of which a selective catalytic reduction (SCR) is brought about and supported. This means that the SCR catalytic converter catalyzes the SCR reaction. The nitrogen oxide (NOx) contained within the exhaust gas is reduced by this selective catalytic reduction, meaning that it is at least partially removed from the exhaust gas. This removal of the nitrogen oxide from the exhaust gas is also known as denitrification. In the course of the SCR, the nitrogen oxide contained within the exhaust gas reacts in particular with elements of a reduction agent which is introduced to the exhaust gas or with elements which form from the reduction agent to become nitrogen and water, in particular, the reduction agent is an aqueous urea solution. Ammonia ($NH_3$), which acts to reduce nitrogen oxide in the SCR, is formed from this aqueous urea solution.

Moreover, particularly exhaust gas after-treatment units for internal combustion engines that are configured as diesel engines comprise at least one particle filter, through which the exhaust gas can flow and which is arranged upstream of the SCR catalytic converter—in the flow direction of the exhaust gas through the exhaust gas after-treatment unit—to retain soot particles from the exhaust gas. The exhaust gas is filtered by means of the particle filter so that at least some of the soot particles contained in the exhaust gas are filtered out of the exhaust gas by means of the particle filter. If the internal combustion engine is configured as a diesel engine, then the particle filter is usually also described as a diesel particle filter (DPF).

Additionally, modern exhaust gas after-treatment units, especially those intended for diesel engines, usually have an oxidation catalytic converter (DOC) upstream of the particle filter in the flow direction of the exhaust gas through the exhaust gas after-treatment unit.

The objective of the present invention is to further develop an exhaust gas after-treatment unit of the aforementioned type which allows for the implementation of an operation that is especially favorable in terms of exhaust emissions.

In order to further develop an exhaust gas after-treatment unit in such a way that it is possible to implement an operation that is especially favorable in terms of exhaust emissions, the invention provides that the exhaust gas after-treatment unit has a combination catalytic converter, through which the exhaust gas can flow and which is arranged upstream of the particle filter. The combination catalytic converter comprises a first catalytic converter part, which is configured as an SCR catalytic converter or an SCR catalytic converter part. This means that the first catalytic converter part brings about and/or supports a selective catalytic reduction (SCR), wherein nitrogen oxides (NOx) contained in the exhaust gas are reduced, i.e., at least partially removed from the exhaust gas, within the framework of the SCR reaction, in the course of the SCR reaction, the nitrogen oxide contained in the exhaust gas reacts in particular with elements of a reduction agent which is introduced to the exhaust gas or with elements which form from the reduction agent to become nitrogen and water. Here the first catalytic converter part catalyzes the SCR reaction and thus has an SCR effect, and so, with the aid of the first catalytic converter part, nitrogen monoxide (NO) and/or nitrogen dioxide ($NO_2$) in particular can be converted into nitrogen ($N_2$).

The combination catalytic converter further comprises a second catalytic converter part that is arranged downstream of the first catalytic converter part in the direction of flow of the exhaust gas through the exhaust gas after-treatment unit. This means that the exhaust gas flowing through the exhaust gas after-treatment unit initially flows through the first catalytic converter part and subsequently through the second catalytic converter part. The second catalytic converter part is configured as an ammonia slip catalytic converter and has a layer of noble metal with a first noble metal content. In the ammonia slip catalytic converter, ammonia slip from the reduction agent is oxidized into nitrogen and water. An ASC effect in this instance is understood to be a catalytic effect on the oxidation of ammonia ($NH_3$) by the ammonia slip catalytic converter.

The combination catalytic converter further comprises a third catalytic converter part, which is arranged downstream of the second catalytic converter part. This means that the exhaust gas flowing through the exhaust gas after-treatment unit initially flows through the first catalytic converter part, then through the second catalytic converter part and subsequently through the third catalytic converter part, and so the exhaust gas flows through the first, second and third catalytic converter parts in succession. The third catalytic converter part is configured as an oxidation catalytic converter and has a layer of noble metal with a second noble metal content. The oxidation catalytic converter, and thus the third catalytic converter part, perform the task of oxidizing any carbon monoxide (CO) contained in the exhaust gas and any hydrocarbons (HC) contained in the exhaust gas. Therefore, the third catalytic converter part catalyzes, i.e., brings about or supports, the oxidation of uncombusted hydrocarbons and carbon monoxide, and so the third catalytic converter part has an OC effect, in particular a DOC effect. Furthermore, the combination catalytic converter has an SCR layer, especially an upper layer, disposed on the layers of noble metals of the second and third catalytic converter parts, the layer being configured as a copper-zeolite layer (Cu—Z layer), for example, and extending over the entire length L of the second and third catalytic converter parts.

The SCR layer is a fourth component of the combination catalytic converter, for example, wherein the SCR layer is arranged and/or applied to the noble metal layers that extend into deeper wall layers, and so the exhaust gas escaping from the first catalytic converter part and flowing into the second catalytic converter part initially contacts the SCR layer and then diffuses into the deeper noble metal layers of the second catalytic converter part. The SCR layer should be understood such that the SCR layer has an SCR effect, and reduction reactions of nitrogen oxide with ammonia into nitrogen and water vapor are catalyzed in the context of this effect. In the second and third catalytic converter parts of the combination catalytic converter according to the invention, the SCR layer is provided to degrade NH3 slip from the first catalytic converter part by SCR reactions. The SCR layer is thus advantageously disposed directly on the noble metal layers and thereby contacts the respective noble metal layers. It is particularly advantageous for the combination catalytic converter to be configured such that the layers of noble metals and the SCR layer of the second and third catalytic converter parts are applied to the same main body elements of the catalytic converter, and the second and third catalytic converter parts directly adjoin and, if possible, contact each other in the flow direction of the exhaust gas, as a result of which the second and third catalytic converter parts advantageously can be configured to be especially compact and can be produced especially cost-effectively.

Using the exhaust gas after-treatment unit according to the invention, it is possible to prevent excessive nitrogen oxide emissions (NOx emissions), particularly after a start, especially after a cold start, of the internal combustion engine as well as after operating the internal combustion engine in a low-load range. The invention is particularly based on the finding that high nitrogen oxide emissions can normally be generated, particularly after a start, especially after a cold start, of the internal combustion engine as well as following a motor vehicle operation in the low-load range, particularly following an idle operation, including coasting mode, during which the internal combustion engine is in its idle operation, as well as after traffic light waiting periods, during which the internal combustion engine is running and is in its idle operation, since the catalytic converters and filters for the exhaust gas after-treatment unit cool down in these motor vehicle operation modes and are so cold following these motor vehicle operation modes that the catalytic converters and filters must first be brought up to working temperature during the subsequent start-up processes or acceleration processes, during which very high exhaust emissions are produced. The exhaust gas after-treatment unit according to the invention is advantageously especially well-suited for diesel vehicles and especially for diesel trucks, whose emissions, in particular nitrogen oxide emissions, can be kept particularly low by means of the exhaust gas after-treatment unit according to the invention.

More particularly, the invention is based on the finding that future emissions requirements for internal combustion engines, especially diesel engines, will increasingly be aimed at considering various secondary emissions, such as NO2 and N2O, as well as the working capacity of the exhaust gas after-treatment unit in real driving conditions. A rapid warm-up of the SCR catalytic converter, especially after a cold start, and thus high efficiency of the SCR catalytic converter are prevented in conventional exhaust gas after-treatment units, which comprise an oxidation catalytic converter, a particle filter arranged downstream of the oxidation catalytic converter, an SCR catalytic converter downstream of the particle filter and an ASC (ammonia slip catalytic converter) downstream of the SCR catalytic converter. Advantageously, the first catalytic converter part in the combination catalytic converter of the exhaust gas after-treatment unit according to the invention is configured as an SCR catalytic converter and is the first exhaust gas after-treatment unit in the flow direction after the escape of the exhaust gas from the internal combustion engine, and so the exhaust gas temperatures in the first catalytic converter part of the exhaust gas after-treatment unit according to the invention are comparatively high. As a result, the first catalytic converter part, which is configured as an SCR catalytic converter, heats up relatively quickly after a start or low-load operation by the internal combustion engine, and so it is also possible to achieve higher denitrification efficiency in the catalytic converter part configured as an SCR catalytic converter relatively fast after a start or low-load operation by the internal combustion engine. Hereafter, the first catalytic converter part of the exhaust gas after-treatment unit, which is configured as an SCR catalytic converter, will be referred to as the first SCR catalytic converter.

The cooling of the catalytic converters and filters after a cold start or low-load operations by the internal combustion engine is more pronounced with correspondingly higher exhaust gas emissions in motor vehicles in the form of commercial vehicles or heavy-goods vehicles than with passenger cars, since there is a comparatively larger interval with an associatively large distance between the internal combustion engine and an exhaust gas after-treatment unit in commercial vehicles or heavy-goods vehicles than in passenger cars, whereby higher thermal losses occur in commercial vehicles or heavy-goods vehicles than in passenger cars. In a conventional exhaust gas after-treatment unit, the introduction of a reduction agent into the exhaust gas is discontinued under the above-mentioned operating conditions; in other words, in and for a heating phase following a start, particularly a cold start, and also for a heating phase following a low-load operation, since the exhaust gas has a very low temperature under these operating conditions. The introduction of reduction agent is discontinued here so that the reduction agent does not crystallize. The introduction of the reduction agent is normally activated or implemented only when an SCR catalytic converter, in which the reaction agent should be implemented, has a temperature higher than 180 degrees Celsius. Discontinuing the introduction of the reduction agent results in high nitrogen oxide emissions during the specified operating conditions no appropriate countermeasures are undertaken.

Extremely good cold start behavior and advantageous behavior in real driving conditions can be realized by the use of the exhaust gas after-treatment unit according to the invention. Secondary NO2 emissions are kept low, particularly during urban operation, especially from NO2 proportions less than or equal to 50 percent. It has also been shown to be especially beneficial for the first SCR catalytic converter to be smaller than the vanadium-based SCR catalytic converter. Advantageously, in vanadium-based SCR catalytic converters, a comparatively low ammonia fill level is necessary for good denitrification efficiency.

In an advantageous embodiment of the invention, the layers of noble metal are formed from platinum or mixtures of platinum and palladium, and the second noble metal content is higher than the first noble metal content. Noble metal layers consisting of platinum and palladium exhibit high NO2-forming activity and a high catalytic effect for HC oxidation. Furthermore, this embodiment of the invention is based on the following knowledge: The higher the noble metal content of a catalytic converter, the higher the reaction rate of an NH3 formed from the reduction agent into nitrous oxide (N2O) compared to a reaction rate of NH3 into N2. Owing to the lower content of noble metal in the noble metal layer of the second catalytic converter part, an NH3 slip from the first SCR catalytic converter is advantageously substantially oxidized into N2 instead of N2O in the second catalytic converter part, and so no ammonia or only a very small amount of ammonia reaches the third catalytic converter part, which is configured as an oxidation component or oxidation catalytic converter. Due to the higher noble metal content of the noble metal layer provided in the oxidation catalytic converter, incoming ammonia is repeatedly converted to N2O, which is prevented by the second catalytic converter part. With this configuration of the invention, the emissions of climate-affecting N2O can be kept low, while it is still possible to provide a hot first SCR catalytic converter near the internal combustion engine, with the associated necessary addition of NH3 via a reduction agent upstream of an oxidation catalytic converter in the exhaust gas after-treatment unit.

In one embodiment of the invention, the noble metal layer of the second catalytic converter part has a higher platinum content than the noble metal layer of the third catalytic converter part in a mixture of platinum and palladium, where the platinum content is at least 80 percent of the entire mixture. The noble metal layer of the second catalytic converter part can also be composed exclusively of platinum.

In one embodiment of the invention, the noble metal layer of the third catalytic converter part has a platinum content of at least 50 percent in a total mixture of platinum and palladium.

Moreover, it has proven especially advantageous when the first noble metal content is in a range from approximately 1/28316.8 grams per cubic centimeter to approximately 5/28316 grams per cubic centimeter, inclusive. This means that the first noble metal content preferably lies in a range from 1 gram of noble metal per cubic foot to approximately 5 grams of noble metal per cubic foot, inclusive, wherein one cubic foot corresponds at least substantially to 28316.8 cubic centimeters. With the first noble metal content of the second catalytic converter part according to this embodiment of the invention, an NH3 slip from the first SCR catalytic converter can advantageously be substantially oxidized into N2 instead of N2O, and so no ammonia or only a very small amount of ammonia reaches the third catalytic converter part, which is configured as an oxidation catalytic converter.

Finally, it has proven especially advantageous when the second noble metal content is in a range from approximately 5/28316.8 grams per cubic centimeter to approximately 20/28316.8 grams per cubic centimeter, inclusive. With the second noble metal content of the third catalytic converter part according to this embodiment of the invention, it is advantageously possible to achieve a high oxidation rate of HC and a high oxidation rate of NO3 to NO2 in the third catalytic converter part. A high NO2 content at the outlet of the combination catalytic converter and thus before the intake of the exhaust gas into the particle filter advantageously increases a passive regeneration of the particle filter with NO2.

In a further embodiment of the invention, the exhaust gas after-treatment unit is provided with a first metering device, by means of which a reduction agent, in particular an aqueous urea solution, can be introduced into the exhaust gas in at least one location upstream of the combination catalytic converter and thus upstream of the first SCR catalytic converter in order to denitrify the exhaust gas. In this way, nitrogen can be removed from the exhaust gas in an especially effective way so that the emissions, particularly nitrogen oxide emissions, can be kept especially low.

In order to keep nitrogen oxide emissions especially low, a second metering device is provided in a further embodiment of the invention, by means of which a reduction agent, in particular an aqueous urea solution, can be introduced into the exhaust gas in at least one location downstream of the first SCR catalytic converter and thus downstream of the second catalytic converter in order to denitrify the exhaust gas. The second metering device is employed advantageously to provide the reduction agent in the exhaust gas before entry into the second catalytic converter, which is configured as an SCR catalytic converter, since the NH3 slip is oxidized in the second catalytic converter part for the function of the third catalytic converter part, which acts as an oxidation catalytic converter, and so essentially no more NH3 is present in the exhaust gas downstream of the second catalytic converter part of the combination catalytic converter and thus also in the second catalytic converter, which is arranged downstream of the combination catalytic converter. Hereafter, the second catalytic converter part of the exhaust gas after-treatment unit, which is configured as an SCR catalytic converter, will be referred to as the second SCR catalytic converter.

Owing to the use of the combination catalytic converter and the arrangement of the metering devices according to this embodiment of the invention, the NO2-based passive regeneration of the particle filter can take place over particularly long periods of time or almost all the time, since during the NO2-based regeneration of the particle filter, during which the metering of a reduction agent by the first metering device is discontinued, the second metering device can be enabled or activated, and, with the second catalytic converter, a nitrogen oxide reduction can be carried out with the reduction agent introduced by the second metering device. Therefore, advantageously, there is no time limit on the reduction of nitrogen oxide during an NO2-based regeneration of the particle filter in this embodiment of the invention, which would be dictated by a storage capacity for NH3 of the second SCR catalytic converter.

Furthermore, it has been shown to be especially advantageous when the second location at which the reduction agent can be introduced by means of the second metering device is disposed downstream of the particle filter.

In a further embodiment of the invention, the particle filter is provided with a catalyzing coating that is free of heavy metals and precious metals and that oxidizes the soot particles retained by the particle filter. The heavy metal- and precious metal-free particle filter coating in the exhaust gas after-treatment unit according to this embodiment of the invention advantageously contains no environmentally damaging heavy metals and no other toxic or environmentally damaging materials.

In a further embodiment of the invention, the heavy metal- and precious metal-free particle filter coating contains alkaline and/or alkaline-earth compounds. Especially advantageous here is that the heavy metal- and precious metal-free particle filter coating comprises silicates containing alkaline metals. Particle filters with this type of coating, which comprises alkaline metal-containing silicates, can advantageously catalyze solid state reactions with soot particles. The coating of the particle filter has a silicate structure, for example, in which finely distributed alkaline metals, especially potassium, are incorporated as active catalytic coating components. The coating of the particle filters can be applied to different substrates, such as SIC or cordierite.

The coating of the particle filter allows for the passive regeneration of the particle filter on the basis of nitrogen dioxide ($NO_2$), even when there are very small quantities of nitrogen dioxide and/or at already low temperatures, since the reaction of the soot or of the soot particles contained in the particle filter with nitrogen dioxide in the particle filter, the reaction being catalyzed with alkaline or alkaline metal compounds by the coating, is a solid-state reaction that is catalyzed, i.e., supported or brought about, by the coating. This reaction can take place at a particularly high reaction rate. Observed under the same temperature conditions, the reaction of the soot with nitrogen dioxide can occur with smaller quantities of nitrogen dioxide and at higher reaction rates in a particle filter with a coating containing alkaline and/or alkaline earth compounds than in a particle filter with a coating that contains precious metals. The active oxygen ($O_2$)-based soot oxidation and/or regeneration is also catalyzed comparatively better using a coating containing alkaline and/or alkaline earth compounds and takes place even at considerably lower temperatures in particle filters with coatings of this type than in particle filters with precious metal coatings. Therefore, even when $NO_2$ is excluded, particularly during the dispensing of the aqueous urea solution, soot can be oxidized with $O_2$ to carbon dioxide ($CO_2$) and water vapor ($H_2O$) in the particle filter.

Particle filter regeneration should be understood to mean that at least some of the soot particles which are retained in the particle filter are removed from the particle filter within the framework of the regeneration. With increasing operation times and, therefore, with increasing numbers of exhaust gas soot particles being retained, increasing numbers of soot particles are being added to the particle filter. This addition is also known as particle filter loading. Within the framework of a regeneration, the load of the particle filter is at least reduced because the soot particles are oxidized. This means that the particle filter is, for example, oxidized with $NO_2$ or burned off with the aid of $O_2$ within the framework of the regeneration. The role of particle filter coatings is that of catalyzing the oxidation of the soot particles. Coating the particle filter with alkaline and/or alkaline-earth compounds permits an $NO_2$-based particle filter regeneration for significantly smaller quantities of $O_2$ and at a higher reaction rate compared to coating the particle filters with catalytic coatings containing precious metals.

It was surprisingly discovered that the particle filter coating with alkaline metal silicates catalyzes the regeneration of the particle filter particularly well with the aid of $NO_2$, and so this type of regeneration on the basis of $NO_2$, which is also called passive regeneration, leads to a sufficient soot combustion rate even with low initial concentrations of $NO_2$, such as the raw $NO_2$ emissions from the internal combustion engine, and that, advantageously, it is not necessary to carry out $NO_2$-based regeneration continuously in particle filters with this type of coating, but rather that a regeneration which is performed intermittently is sufficient.

Because an $O_2$-based regeneration of the particle filter takes place at significantly lower temperatures in particle filters with coatings containing alkaline and/or alkaline-earth compounds than in particle filters with precious metal coatings, the $O_2$-based regeneration will support the $NO_2$-based regeneration even at temperatures from approximately 300 to 350 degrees Celsius in particle filters with a coating that contains alkaline and/or alkaline-earth compounds. The $O_2$-based soot regeneration can also partially replace the $NO_2$-based regeneration within a temperature window of approximately 300 to 350 degrees Celsius if the $NO_2$-based regeneration is restricted or fails completely due to low $NO_2$ concentrations, as is the case when the total amount of $NO_2$ present in the exhaust gas is consumed in the SCR reaction in the upstream first SCR catalytic converter, which is formed by the first catalytic converter part. Due to the fact that $O_2$-based regeneration in particle filters with alkaline and/or alkaline-earth compound coatings can occur in a temperature range from approximately 300 to 350 degrees Celsius, the $O_2$-based particle filter regeneration can be used without the disadvantage of undesirable temperature-related damage to the exhaust gas after-treatment elements occurring, which can happen with the high temperatures from $O_2$-based regenerations of conventional precious metal-containing particle filters. This is significantly beneficial for the exhaust gas after-treatment device according to the invention, since SCR catalytic converters are especially temperature-sensitive, and high temperatures in the first catalytic converter part of the exhaust gas after-treatment device according to the invention can thereby be prevented during an $O_2$-based regeneration.

As was already indicated, it has been shown to be especially beneficial when the combination catalytic converter, in particular catalytic converter part, is the first exhaust gas after-treatment element through which the exhaust gas passes downstream of the internal combustion engine. In other words, the first catalytic converter part, in particular the combination catalytic converter, is the first exhaust gas after-treatment element through which the exhaust gas from the internal combustion engine passes after the exhaust gas has exited the internal combustion engine so that, relative to the direction of exhaust gas flow from the internal combustion engine to the first SCR catalytic converter, there is no exhaust gas after-treatment element to perform after-treatment of the internal combustion engine exhaust gas between the first combination catalytic converter, in particular the first catalytic converter part, and the internal combustion engine. Excessive cooling of the combination catalytic converter can be prevented in this way.

In one embodiment of the invention, the second catalytic converter part and the third catalytic converter part form a hybrid catalytic converter, wherein the volume of the second catalytic converter part through which the exhaust gas is flowing is approximately twice as large as the volume of the third catalytic converter part. It has been surprisingly demonstrated that the volume ratio of the second and third catalytic converter parts according to this embodiment of the invention is necessary in order for the exhaust gas after-treatment unit to keep a concentration of newly formed $N_2O$ so low that future emissions requirements for secondary emissions can be held below real driving conditions.

The invention also includes a procedure for operating an exhaust gas after-treatment unit according to the invention. Advantageous embodiments of the exhaust gas after-treatment unit according to the invention should be considered advantageous embodiments of the procedure according to the invention and vice versa.

Further advantages, features and details of the invention are disclosed by the description of preferred embodiments that follows and with reference to the drawings. The features and combinations of features stated above in the description as well as the features and combinations of features stated below in the description of the figures and/or shown in the figures alone can be used not only in the specified combination in each case, but also in other combinations or in isolation without departing from the scope of the invention.

DETAILED DESCRIPTION OF THE DRAWINGS

Identical or functionally identical elements are provided with the same reference signs in the figures.

Figure 1:
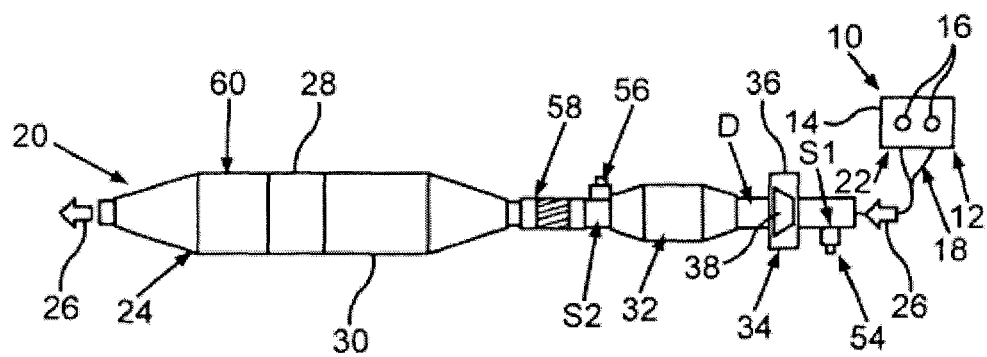
FIG. 1 is a schematic side view of an exhaust gas after-treatment unit according to a first embodiment for an internal combustion engine of a motor vehicle, comprising at least one combination catalytic converter through which the exhaust gas from the internal combustion engine can flow, comprising at least one particle filter, through which the exhaust gas can flow and which is arranged downstream of the combination catalytic converter, for retaining soot particles from the exhaust gas, and comprising an SCR catalytic converter, through which the exhaust gas can flow and which is arranged downstream of the particle filter.

FIG. 1 shows a drive mechanism, which as a whole is designated 10, for a motor vehicle, particularly a commercial vehicle. The drive mechanism 10 comprises an internal combustion engine 12, which is presently designed as a reciprocating internal combustion engine. The commercial vehicle can therefore be driven by means of the internal combustion engine 12. The internal combustion engine 12 is configured as a diesel engine. The internal combustion engine 12 comprises a crankcase 14, by which a multitude of combustion chambers are produced in the form of cylinders 16 of the internal combustion engine 12. During the internal combustion engine's 12 fired operation, air and fuel, particularly liquid fuel, are introduced into the cylinders 16 so that a fuel-air mixture is created in each cylinder 16. This fuel-air mixture is burned, which results in exhaust gas from the internal combustion engine. The exhaust gas from the cylinders 16 is conducted into the exhaust manifold 18 and then diverted out of the internal combustion engine 12.

The drive mechanism 10 further comprises an exhaust system 20, which is identified as an exhaust channel. The exhaust gas from the cylinders 16 can flow through the exhaust system 20. The exhaust gas from internal combustion engine 12 is purged by means of the exhaust system 20. The internal combustion engine 12 has a so-called outlet 22, via which the exhaust gas from the internal combustion engine 12 flows out of and into the exhaust system 20. The outlet 22 is also described as an engine outlet or exhaust or an engine exhaust and is located on an outlet side of the internal combustion engine 12.

The exhaust system 20 comprises an exhaust gas after-treatment unit, which as a whole is designated 24 and is shown according to a first embodiment in FIG. 1. The exhaust gas from the internal combustion engine 12 is purged by means of the exhaust gas after-treatment unit 24. In the process, the exhaust gas can flow through the exhaust system 20 and the exhaust gas after-treatment unit 24, wherein the flowing and/or flow of the exhaust gas through the exhaust system 20 and thus through the exhaust gas after-treatment unit 24 is illustrated by arrow 26 in FIG. 1. Relative to the direction of exhaust gas flow through the exhaust system 20 and thus through the exhaust gas alter treatment unit 24, the exhaust gas after-treatment unit 24 is disposed downstream of the outlet 22. Because the exhaust gas has not yet been after-treated by the exhaust gas after-treatment unit 24 upstream of the exhaust gas after-treatment unit 24 and downstream of the outlet 22, the emissions from the internal combustion engine 12 in an area between the outlet 22 and in front of, i.e., upstream of, the exhaust gas after-treatment unit 24 are described as raw emissions.

The exhaust gas after-treatment unit 24 comprises at least one first catalytic converter 32, through which the exhaust gas from the internal combustion engine 12 can flow and which is configured as a combination catalytic converter, with at least one particle filter 30, through which the exhaust gas flows and which is arranged downstream of the first catalytic converter 32, for retaining soot particles from the exhaust gas, and comprises a second catalytic converter 28, through which the exhaust gas can flow and which is located downstream of the particle filter 30 and is configured as an SCR catalytic converter. The combination catalytic converter 32 is the first exhaust gas after-treatment element through which the exhaust gas passes downstream of the outlet 22 and is therefore after the exhaust gas has exited the internal combustion engine 12. This means that the first combination catalytic converter 32 is the first exhaust gas after-treatment element through which the exhaust gas can flow downstream of the internal combustion engine 12, and so there is no exhaust gas after-treatment element through which the exhaust gas can flow and by means of which the exhaust gas can be after-treated between the combination catalytic converter 32 and the internal combustion engine 12, in particular the outlet 22.

The drive mechanism 10 further comprises an exhaust gas turbocharger, also called a turbocharger, which is not shown in its entirety in FIG. 1. Moreover, the drive mechanism 10 comprises, for example, an intake channel, which is not shown in FIG. 1 and through which can flow the aforementioned air or a mixture of recirculated exhaust gas and air that is supplied to the cylinders 16. The exhaust gas turbocharger comprises a compressor, which is arranged in the intake channel and by means of which the air or mixture of recirculated exhaust gas and air flowing through the intake channel and supplied to the cylinders 16 can be or is compressed.

Furthermore, the exhaust gas turbocharger comprises a turbine 34, which is arranged in the exhaust system 20, and the exhaust gas flowing through the exhaust system 20 can accordingly flow through the turbine. Relative to the direction of exhaust gas flow through the exhaust system 20, the turbine 34 is downstream of the combination catalytic converter 32. The turbine 34 comprises, for example, a turbine housing 36 and a turbine wheel 38, which is arranged in the turbine housing 36 and which can be driven by the exhaust gas flowing through the turbine 34 and which can be rotated about a rotary axis relative to the turbine housing 36. The compressor comprises a compressor wheel, for example, by means of which the air flowing through the intake channel can be compressed. The compressor wheel can be arranged, for example, coaxially to the turbine wheel 38 and can thus rotated about the aforementioned rotary axis. The exhaust gas turbocharger further comprises a shaft, not shown in FIG. 1, which is connected for conjoint rotation with both the turbine wheel 38 and the compressor wheel. In this way, the compressor wheel can be driven by the turbine wheel 38 via the shaft. Since the turbine wheel 38 is or can be driven by the exhaust gas, and since the air passing though the intake channel is compressed by the driving of compressor wheel, energy contained in the exhaust gas can be used to compress the air, and so an especially efficient operation of the driving mechanism 10 can be presented.

The retaining of soot particles from the exhaust gas by the particle filter 30 should be understood to mean that the soot particles in the exhaust gas which are held back by the particle filter 30 can be filtered out of the exhaust gas and thereby retained. After the exhaust gas has exited the internal combustion engine 12, there are soot particles contained within the exhaust gas which are at least partially filtered out of the exhaust gas by means of the particle filter 30. The soot particles are caught in the particle filter 30, particularly in its interior, or are distributed over the particle filter 30, particularly in its interior, so that the particle filter 30 collects more soot particles as its operational life increases. This accumulation is also known as the loading or load of the particle filter 30. If the internal combustion engine 12 is configured as a diesel engine, for example, the particle filter 30 is also described as a diesel particle filter (DPF).

Figure 3:
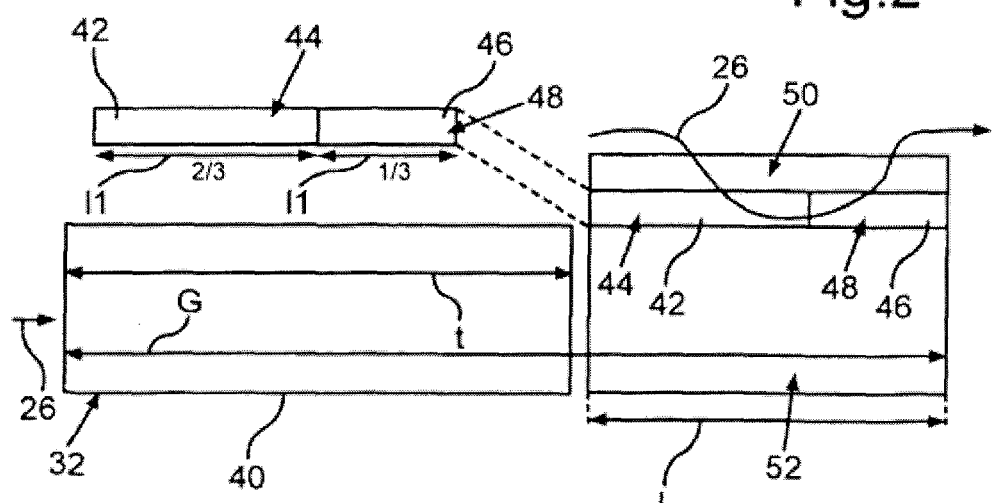
FIG. 3 is a partial schematic longitudinal sectional view of the combination catalytic converter.

In order to implement operations with particularly favorable emissions, the combination catalytic converter 32—as can be seen especially well in conjunction with FIG. 3—comprises a first catalytic converter part 40, which is considered a first SCR catalytic converter.

This first SCR catalytic converter is configured as a vanadium-based SCR catalytic converter, wherein vanadium is also denominated with Va. Therefore and because an SCR catalytic converter is generally simply also called an SCR, the first catalytic converter part 40 in FIG. 3 is also designated a Va-SCR.

The combination catalytic converter 32 additionally comprises a second catalytic converter part 42, which is downstream of the first catalytic converter part 40—in the flow direction of the exhaust gas through the combination catalytic converter 32—and which is configured as an ammonia slip catalytic converter (ASC) and has a noble metal layer 44, which is formed exclusively of platinum and has a first platinum content. The layer of noble metal 44 in the second catalytic converter part 42 can also be formed with a noble metal mixture of platinum and palladium, wherein the platinum content of the platinum-palladium mixture is at least 80 percent. The combination catalytic converter 32 additionally comprises a third catalytic converter part 46, which is downstream of the second catalytic converter part 42—in the flow direction of the exhaust gas through the combination catalytic converter 32—and which is configured as an oxidation catalytic converter and has a noble metal layer 48, which is likewise formed exclusively of platinum and has a second platinum content. The layer of noble metal 48 in the third catalytic converter part 42 can also be formed with a noble metal mixture of platinum and palladium rather than with pure platinum, wherein the platinum content of the platinum-palladium mixture is at least 50 percent. Since the present internal combustion engine 12 is configured as a diesel engine, for example, the oxidation catalytic converter is also referred to as a diesel oxidation catalytic converter (DOC). Moreover, the combination catalytic converter 32 comprises an SCR layer 50, which is disposed on the respective platinum layers 44 and 48 and comprises copper (Cu) and zeolite (Z) and is thus also called the Cu—Z layer.

The respective platinum layers 44 and 48 are layers containing platinum (Pt). In the combination catalytic converter 32 shown in FIG. 3, the first platinum content lies in a range from 1 gram per cubic foot ($g/ft^3$) to 5 grams per cubic foot, inclusive, wherein the second platinum content lies in a range from 5 grams per cubic foot to 20 grams per cubic foot, inclusive. One cubic foot ($ft^3$) corresponds at least substantially to 28316.8 cubic centimeters ($cm^3$) and describes the volume of the respective platinum layers 44 and 48. It has been shown to be especially beneficial if the second platinum content is greater than the first platinum content.

It can be discerned from FIG. 3 that a hybrid catalytic converter, designated 52 as a whole, is formed by the second catalytic converter part 42 and the third catalytic converter part 46 as well as by the SCR layer 50, the hybrid catalytic converter having both an ammonia slip effect (ASC effect) and an oxidation effect (DOC effect), so that the combination catalytic converter is also designated a hybrid ASC-DOC in FIG. 3. Here the hybrid catalytic converter 52 has a total length L running in the flow direction of the exhaust gas. The second catalytic converter part 42 has a first partial length l1 running in the flow direction of the exhaust gas, wherein the third catalytic converter part 46 has a second partial length l2 running in the flow direction of the exhaust gas. The partial lengths l1 and l2 add up to the total length L. The SCR layer 50 extends over the total length L of the hybrid catalytic converter 52 and thus over the partial length l1 of the second catalytic converter part 42 and the partial length l2 of the third catalytic converter part 46. In the present case, the first partial length l1 equals two-thirds of the total length L, wherein the partial length l2 equals one-third of the total length L. The combination catalytic converter 32 as a whole has a length G running in the flow direction of the exhaust gas, wherein the first catalytic converter part 40 has a partial length t running in the flow direction of the exhaust gas.

The partial length t and total length L add up to the length of the combination catalytic converter 32. For instance, it is provided that the partial length t is in a range from 50 percent to 90 percent, inclusive, of the length G, wherein the total length L lies in a range, for example, from 10 percent to 50 percent, inclusive, of the length C.

The SCR layer disposed on the platinum layers 44 and 48 is identified with reference sign 50 and is configured as a copper-zeolite layer (Cu—Z layer), for example. The SCR layer 50 should be understood such that the SCR layer 50 has an SCR effect. This means that the SCR layer 50 catalyzes, i.e., brings about and/or supports, a selective catalytic reduction (SCR), within the scope of which the nitrogen oxides contained in the exhaust gas are converted into nitrogen and water.

It can be discerned from FIG. 3 that the SCR layer 50 is an upper layer and/or an upper coating, which is disposed on the platinum layers 44 and 48 and/or applied to the platinum layers 44 and 48. The SCR layer 50 is applied directly to the platinum layers 44 and 48 such that the SCR layer 50 contacts the platinum layers 44 and 48. The lower platinum layer 44 of the second catalytic converter part 42 serves to oxidize excess ammonia (NH3), and so the second catalytic converter part 42 functions as an ammonia slip catalytic converter. The rear platinum layer 48 serves to oxidize NO and uncombusted hydrocarbons (HC), and so, for example, NO2 is formed by means of the platinum layer 48 in order to achieve a passive soot burn-off, i.e., a passive regeneration of the particle filter 30, and provide a sufficient temperature for achieving an active regeneration of the particle filter 30. The passive regeneration is an NO2-based regeneration, by means of which the loading of the particle filter 30 is at least reduced. The aforementioned active regeneration is an oxygen-based, i.e., O2-based, regeneration that can aid in at least reducing the loading of the particle filter 30. Each platinum layer 44 and 48 here is a lower platinum layer that is disposed below the SCR layer 50. The objective for both platinum layers 44 and 48 is lower N2O selectivity.

In particular, it is possible that partial length 11 lies in a range from 0 percent to 80 percent, inclusive, of the total length L. Furthermore, it is possible that partial length 12 lies in a range from 20 percent to 100 percent, inclusive, of the total length L.

The drive mechanism 10, in particular the exhaust gas after treatment unit 24, comprises a first metering device 54, by means of which a reduction agent can be introduced into the exhaust gas in at least one first location S1 upstream of the combination catalytic converter 32 in order to denitrify the exhaust gas. The reduction agent is an aqueous urea solution, for instance, from which ammonia is produced, which can react with the nitrogen oxides in the exhaust gas within the scope of the aforementioned SCR to yield water and nitrogen. FIG. 1 shows that the first location S1 and the first metering device 54 are upstream of the turbine blade 38 and the turbine 34. Preferably, however, the first location S1 and the first metering device 54 are upstream of the combination catalytic converter 32 and downstream of the turbine blade 38 and the turbine 34.

Additionally, a second metering device 56 is provided, by means of which a reduction agent can be introduced into the exhaust gas in at least one second location S2 downstream of the combination catalytic converter 32 and upstream of the SCR catalytic converter 28 in order to denitrify the exhaust gas. As a result of the conversion of nitrogen oxides in the exhaust gas into water and nitrogen, as was described earlier, at least a part of the nitrogen oxide is removed from the exhaust gas. This removal of the nitrogen oxides is also referred to as the denitrification of the exhaust gas, which—as described—occurs with the aid of the reduction agent. In the first embodiment shown in FIG. 1, the second location S2 and the second metering device 56 are located upstream of the SCR catalytic converter 28 and downstream of the particle filter 30.

Downstream of the second location 82 and of the second metering device 56 and upstream of the SCR catalytic converter 28 is a mixing device 58, by means of which the metered reduction agent is mixed and/or blended with the exhaust gas. In the first embodiment, the mixing device 58 is arranged upstream of the particle filter 30. Furthermore, the exhaust gas after-treatment unit 24 comprises a catalytic converter 60 that is arranged downstream of the SCR catalytic converter 28 and is configured as an SCR catalytic converter and/or ammonia slip catalytic converter.

In order to make it possible to operate with partially favorable emissions, the particle filter 30 is provided with a catalyzing coating on the basis of alkaline metal-silicate structures, which is free of heavy metals and precious metals and which oxidizes the soot particles retained by the particle filter 30, and so the coating is a coating with alkaline metal-containing silicates. This coating performs a particularly efficient and effective catalysis of a soot oxidation, i.e., the oxidation of the soot particles that are retained by the particle filter 30 and are therefore found in the particle filter 30. As a result of this soot particle oxidation, the soot particles are removed from the particle filter 30, whereby the loading is at least reduced. This reduction in the loading of the particle filter 30 is also known as regeneration or particle filter 30 regeneration.

Figure 2:
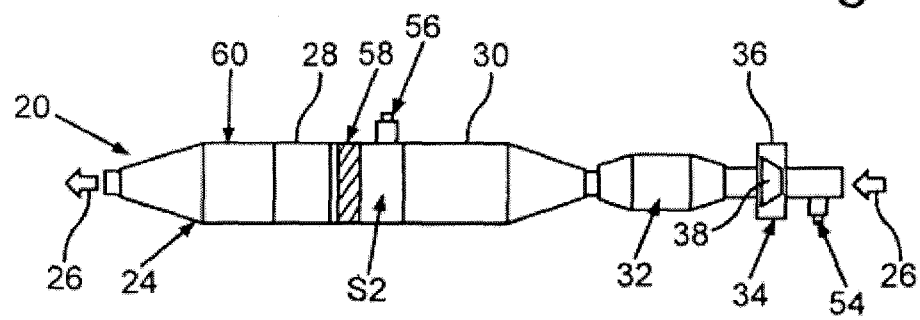
FIG. 2 is a schematic side view of the exhaust gas after-treatment unit according to a second embodiment.

FIG. 2 shows a second embodiment of the drive mechanism 10. Because of the internal combustion engine 12, an overview is not shown in FIG. 2. The second embodiment differs from the first embodiment in particular by virtue of the fact that the second location 52 and the second metering device 56 are located upstream of the SCR catalytic converter 28 but downstream of the particle filter 30. Here the mixing device 58 is arranged downstream of the second location S2 and the second metering device 56 and upstream of the SCR catalytic converter 28.

An HC doser, not shown in the Figures, can additionally be provided and used to introduce uncombusted hydrocarbons into the exhaust has at a metering location D. It can be discerned from FIGS. 1 and 2 that the metering location D and the HC doser are upstream of the combination catalytic converter 32 and downstream of the turbine blade 38 and the turbine 34. Alternatively, it is possible that the HC doser and the metering location D, at which the uncombusted hydrocarbons (HC) are introduced and/or metered into the exhaust gas by means of the HC doser, are arranged upstream of the combination catalytic converter 32 and, in particular, upstream of the turbine blade 38 and the turbine 34. Alternatively or in addition to the use of the HC doser, engine-internal measures for introducing uncombusted hydrocarbons into the exhaust gas are possible. An example of an engine-internal measure of this type is particularly a late injection of fuel into at least one of the cylinders 16.

The catalytic converter volumes of the combination catalytic converter 32 as well as the volumes of the catalytic converter parts 40, 42 and 46 and those of the catalytic converters 28 and 60 are determined by the swept volume of the internal combustion engine 12. The first catalytic converter part 40 in FIG. 1 or FIG. 2 has a volume through which the exhaust gas can flow and which, for the internal combustion engines of commercial vehicles, is in a range of approximately 44 to 105 percent of the swept volume of the internal combustion engine 12. For commercial vehicle engines, the sum of the volumes of the SCR catalytic converter 28 and the catalytic converter 60 lies in a range of approximately 78 to 179 percent of the swept volume of the internal combustion engine 12. The ratio of the volume of the first catalytic converter part 40 to the sum of the volumes of the SCR catalytic converter 28 and the catalytic converter 60, for example, lies in a range of approximately 0.25 to 1.34, inclusive.

Hereafter, a start condition for the passive, NO2-based regeneration of the particle filter 30, for example, will be illustrated: For instance, if the SCR catalytic converter 28 has a sufficient temperature, e.g., in a range from 200 to 250 degrees Celsius, then the first metering device 54 is deactivated so that NO2 formed within the engine is not converted at the first SCR, and NO2 is additionally formed via the hybrid catalytic converter 52. Hereafter, stop conditions for passive regeneration will be illustrated: For example, if the temperature of the SCR catalytic converter 28 falls below a prescribable threshold value, e.g., in a range from 180 to 220 degrees Celsius, then the first metering device 54 is activated so that a nitrogen oxide conversion occurs at lower exhaust temperatures by means of the first catalytic converter part 40, which functions as an SCR catalytic converter. Alternatively or additionally, the stop condition includes the stipulation that the space velocity of the SCR catalytic converter 28 must exceed a prescribable threshold value, e.g., in a range from 40,000 to 60,000, and/or that a storage rate must exceed a threshold value and/or that the nitrogen oxide content must exceed a prescribable threshold value.

The duration of the active regeneration falls in a range, for example, of between 15 minutes and 60 minutes, inclusive, and is carried out, for example, at intervals of more than 100 hours. The proportion of the first catalytic converter part 40 in the entire SCR volume of the exhaust gas after-treatment unit 24 lies within a range of 20 percent to 50 percent, inclusive, for example. Parameters which trigger passive NO2-based regeneration are described below: For instance, the state of the first metering device 54 is the value that triggers passive regeneration.

Parameters which trigger active O2-based regeneration are described below:
model-based soot loading limit (soot quantity trigger);
maximum duration without regeneration approx. 100 hours (time trigger);
counter-pressure>factor 2 compared to empty filter (counter-pressure trigger); and
favorable temperatures>300 degrees Celsius+minimum soot quantity (5 grams per liter) (temperature trigger).

Parameters which interrupt or end a regeneration are explained below:
soot quantity<1 gram per liter; and
counter-pressure<1.1 compared to empty filter.

Figure 4:
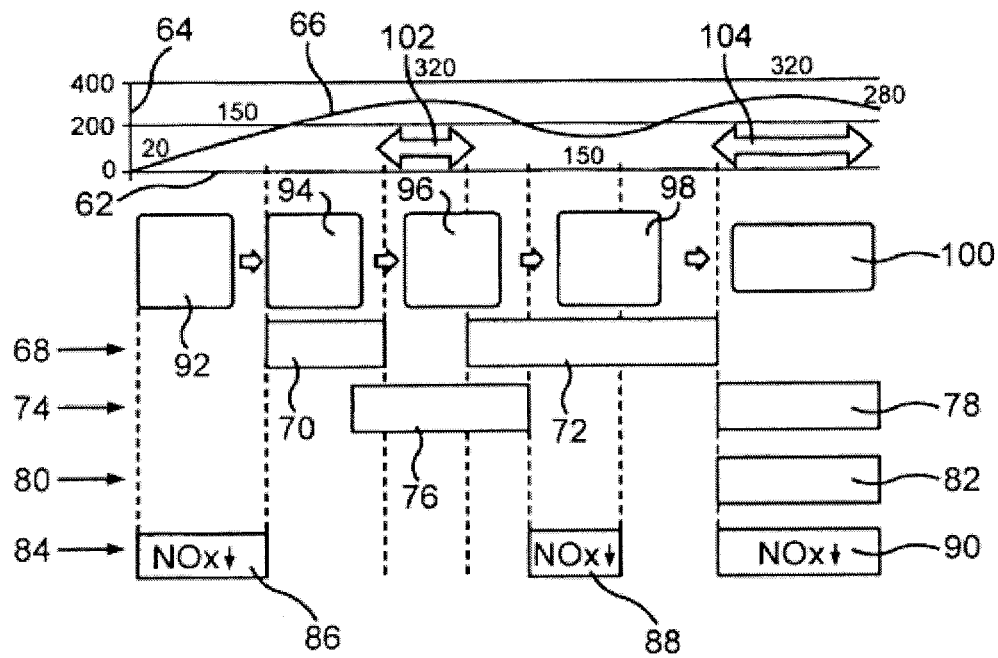
FIG. 4 is a diagram to demonstrate a procedure for the operation of the exhaust gas after-treatment unit.
Figure 5:
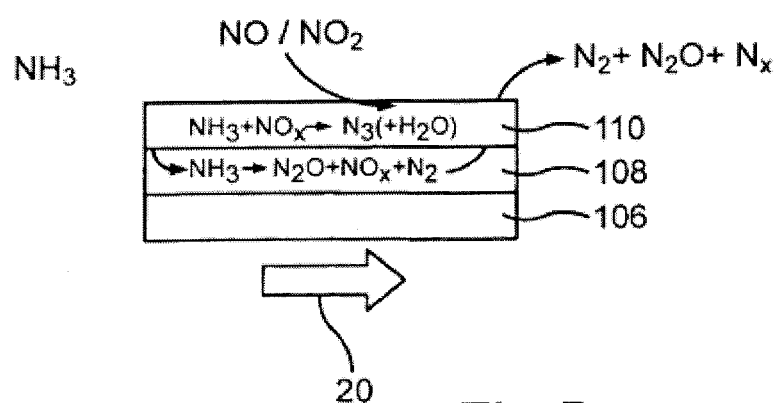

FIG. 4 shows a diagram to illustrate a procedure for operating the drive mechanism 10, particularly of the exhaust gas after-treatment unit 24. The diagram shown in FIG. 4 includes an abscissa 62, upon which the time, particularly the seconds, is displayed. Furthermore, the diagram shows an ordinate 64, upon which the temperature, particularly in degrees Celsius, is displayed. A curve 66 is recorded in the diagram which illustrates the temperature of the first catalytic converter part 40, wherein the first catalytic converter part 40 is also known as a ccSCR. In other words, the curve 66 is a temporal progression of the temperature of the first catalytic converter part, which functions as an SCR catalytic converter 40. A line 68 illustrates the status of the metering device 54. The first metering device 54 is activated at blocks 70 and 72, which are included in line 68, and so blocks 70 and 72 illustrate the respective timespans during which the reduction agent is introduced, particularly injected, into the exhaust gas by the activated metering device 54.

A line 74 illustrates a status of the second metering device 56, wherein the second metering device 56 is activated at blocks 76 and 78, which are included in line 74. Therefore, blocks 76 and 78 illustrate the respective timespans during which the reduction agent is introduced, particularly injected, into the exhaust gas by the activated second metering device 56. A line 80 illustrates the status of the HC doser or an activation of engine-internal measures to increase the exhaust gas temperature. A block 82 included in line 80 illustrates a timespan during which the HC doser is activated, and so the uncombusted hydrocarbons (HC) can be introduced, especially injected, into the exhaust gas by the activated HC doser at metering location D during the timespan illustrated by block 82. Furthermore, a line 84 on the diagram illustrates the raw nitrogen oxide emissions of the internal combustion engine 12. Blocks 86, 88 and 90, which are included in line 84, show nitrogen oxide reduction measures within the internal combustion engine. As the internal combustion engine 12 is also described as a combustion engine, the measures taken within the internal combustion engine are also described as combustion engine-internal measures or as CE measures.

Blocks 86, 88 and 90 show the respective timespans during which combustion engine measures, i.e., measures within the internal combustion engine, are carried out to reduce nitrogen oxide, i.e., for denitrification. Adjusting an injection time to a later point is an example of a CE measure such as this. Furthermore, the internal combustion engine measure can be an especially high exhaust gas recirculation rate. A further CE measure is, for example, to reduce the air mass flow rate to the relevant cylinder 16, such as by throttling. This takes place, for example, by means of a throttle valve arranged on an intake channel through which the air can flow. A further internal combustion engine measure can be, for example, that the internal combustion engine is run or operated with higher loads.

A block 92, which has been incorporated into the diagram, illustrates the start, particularly a cold start, of an internal combustion engine 12. At least one internal combustion engine measure, which is illustrated using block 86, is carried out during this cold start. A block 94, which has been incorporated into the diagram, illustrates a heating phase, during which the metering device 54 is activated—as is evident at block 70. This is followed by an optimal consumption phase, which is illustrated by a block 96. A block 98 illustrates a low load operation of the internal combustion engine 12, wherein at least one internal combustion engine measure, illustrated by block 88, is carried out.

Furthermore, the metering device 54 is activated (block 72), or engine-internal measures are triggered. An optimal consumption phase follows, which is illustrated by a block 100, during which the HC doser is activated, for example (block 82). Furthermore—as is illustrated by block 90—at least one internal combustion engine measure is carried out. It is preferable for the HC doser to be activated only when the first metering device 54 is deactivated, meaning when the introduction of reduction agent to the exhaust gas by the metering device 54 has stopped. If the respective metering device 54 or 56 is deactivated, then the introduction of reduction agent into the exhaust gas by the respective metering device 54 or 56 has stopped. If the HC doser is activated, then uncombusted hydrocarbons (HC) are introduced into the exhaust gas by the HC closer. If the HC doser is deactivated, the introduction of HC into the exhaust gas by the HC closer has stopped.

Furthermore, a double arrow 102 in FIG. 4 illustrates the passive regeneration or a regeneration period of the passive regeneration, wherein a double arrow 104 illustrates the active regeneration or the regeneration period of the active regeneration.

The invention claimed is:
1. An exhaust gas after-treatment unit for an internal combustion engine of a motor vehicle, comprising:
a first catalytic converter through which exhaust gas from the internal combustion engine is flowable;
a particle filter through which the exhaust gas is flowable and which is disposed downstream of the first catalytic converter, wherein soot particles from the exhaust gas are retainable by the particle filter; and
a second catalytic converter through which the exhaust gas is flowable and which is disposed downstream of the particle filter and is configured as a selective catalytic reduction (SCR) catalytic converter;
wherein the first catalytic converter is a combination catalytic converter and includes:
a first catalytic converter part which is configured as an SCR catalytic converter;
a second catalytic converter part which is disposed downstream of the first catalytic converter part, is configured as an ammonia slip catalytic converter, and has a first layer of noble metals with a first noble metal content;
a third catalytic converter part which is disposed downstream of the second catalytic converter part, is configured as an oxidation catalytic converter, and has a second layer of noble metals with a second noble metal content; and an SCR layer which is disposed on the first and the second layers of noble metals and extends over an entire length of the second and the third catalytic converter parts.

2. The exhaust gas after-treatment unit according to claim 1, wherein the first and the second layers of noble metals are formed from platinum or mixtures of platinum and palladium and wherein the second noble metal content is higher than the first noble metal content.

3. The exhaust gas after-treatment unit according to claim 2, wherein the second layer of noble metals of the third catalytic converter part has a platinum content of at least 50 percent in a mixture of platinum and palladium.

4. The exhaust gas after-treatment unit according to claim 1, wherein the first noble metal content is in a range from approximately 1/28316.8 grams per cubic centimeter to approximately 5/28316.8 grams per cubic centimeter, inclusive.

5. The exhaust gas after-treatment unit according to claim 1, wherein the second noble metal content is in a range from approximately 5/28316.8 grams per cubic centimeter to approximately 20/28316.8 grams per cubic centimeter, inclusive.

6. The exhaust gas after-treatment unit according to claim 1, wherein the particle filter includes a catalyzing coating that is free of heavy metals and precious metals and that oxidizes the soot particles retained by the particle filter.

7. The exhaust gas after-treatment unit according to claim 6, wherein the catalyzing coating contains alkaline and alkaline-earth compounds.

8. The exhaust gas after-treatment unit according to claim 1 further comprising a first metering device via which a first reduction agent is introducible into the exhaust gas in a first location upstream of the first catalytic converter.

9. The exhaust gas after-treatment unit according to claim 8 further comprising a second metering device via which a second reduction agent is introducible into the exhaust gas in a second location downstream of the first catalytic converter and upstream of the second catalytic converter.

10. The exhaust gas after-treatment unit according to claim 1, wherein the first catalytic converter part of the first catalytic converter is a first exhaust gas after-treatment element through which the exhaust gas is flowable downstream of the internal combustion engine.

11. The exhaust gas after-treatment unit according to claim 1, wherein the second catalytic converter part and the third catalytic converter part form a hybrid catalytic converter, wherein a volume of the second catalytic converter part through which the exhaust gas is flowable is approximately twice as large as a volume of the third catalytic converter part.

* * * * *